United States Patent [19]

Ray

[11] 4,069,911
[45] Jan. 24, 1978

[54] BAND CONVEYOR
[75] Inventor: Eric Thomas Ray, Andover, England
[73] Assignee: AMF Incorporated, White Plains, N.Y.
[21] Appl. No.: 674,468
[22] Filed: Apr. 7, 1976
[30] Foreign Application Priority Data
Apr. 17, 1975 United Kingdom .............. 15838/75
Apr. 17, 1975 United Kingdom .............. 15837/75
[51] Int. Cl.² ........................................... B65G 15/16
[52] U.S. Cl. .................................. 198/627; 198/834; 198/853; 74/245 C; 131/108
[58] Field of Search ............... 198/162, 195, 189, 604, 198/627, 793, 850, 851, 853, 834; 74/236, 243 C, 243 S, 245 C, 245 S, 245 LP, 250 R, 250 S, 250 C; 100/94, 96, 151; 131/81 R, 108

[56] References Cited
U.S. PATENT DOCUMENTS

| 1,004,126 | 9/1911 | Williams et al. ..................... 198/162 |
| 1,108,163 | 8/1914 | Frick ................................ 198/195 X |
| 1,376,449 | 5/1921 | McKenzie .......................... 198/195 X |
| 1,809,054 | 6/1931 | Mattison ............................ 198/195 |
| 2,362,697 | 11/1944 | Huddle ............................. 198/162 |
| 2,428,249 | 9/1947 | Stuart et al. ..................... 198/162 X |
| 2,490,381 | 12/1949 | Shields ............................ 198/604 |
| 2,682,216 | 6/1954 | Shields ............................ 198/604 |
| 2,693,268 | 11/1954 | Ball ................................. 198/195 X |
| 2,999,581 | 9/1961 | Baugh .............................. 198/195 X |
| 3,245,517 | 4/1966 | Ward ............................... 198/195 |
| 3,581,876 | 6/1971 | Keith ............................... 198/627 |
| 3,774,752 | 11/1973 | Harvey ............................. 198/195 |

FOREIGN PATENT DOCUMENTS

| 775,412 | 1/1968 | Canada ............................. 198/162 |
| 1,168,336 | 4/1964 | Germany ........................... 198/162 |
| 30,517 | 8/1933 | Netherlands ....................... 198/162 |
| 54,602 | 12/1967 | Poland ............................ 198/189 |
| 751,014 | 6/1956 | United Kingdom ................. 198/162 |

Primary Examiner—Evon C. Blunk
Assistant Examiner—Richard K. Thomson
Attorney, Agent, or Firm—George W. Price; Charles J. Worth

[57] ABSTRACT

A conveyor, particularly for feeding tobacco to a cutting drum, comprises a number of articulated slats passing around sprocket wheels. The slats are identical and each has extensions and recesses. The extensions of one slat enter the recesses of the next adjacent slat, and are retained by a pin passing through the extensions of adjacent slats. The underside of each extension has a flat surface for contacting a support plate and the top face of the sprocket teeth contact the slats so that the flat underside of each extension is not contacted by the sprocket wheel, in order to maintain a constant pitch as the band travels around the sprocket wheels. In this way the spacing between the conveyor and a dead plate positioned to remove tobacco from the band as it passes over a sprocket wheel remains constant.

1 Claim, 9 Drawing Figures

BAND CONVEYOR

BACKGROUND OF THE INVENTION

This invention relates to a band conveyor, particularly for use in feeding tobacco to the cutter drum of a tobacco cutting machine.

Such a conveyor is described in British Pat. Specification No. 857,997 where the conveyor consists of upper and lower links, the shaping of which are such that the upper links have only a line contact with each other both when the band is straight and when it is curved. This construction is not entirely satisfactory in that it requires two different types of link and also the support on the sprocket teeth of a sprocket wheel for driving the band occurs at positions on the links which are subject to wear whereby a constant pitch cannot be maintained as the belt travels across the sprocket.

In use, a pair of such conveyors is arranged in converging relationship so that the tobacco is compressed as it is fed to the cutter drum. A support plate supports at least one run of the conveyor and a dead plate is provided to remove the compressed tobacco from the conveyor.

With the prior art conveyor the distance between the conveyor and the dead plate changes as the links become subject to wear as a result of friction between the links and the support plate.

OBJECTS OF THE INVENTION

It is an object of this invention to provide a conveyor which requires only one type of link.

It is a further object of this invention to provide a conveyor in which the support on the sprocket teeth of the sprocket wheel for driving the band occurs at positions on the band which are subject to very little wear.

It is yet a further object of this invention to provide a conveyor in which a constant pitch can be maintained as the band travels across the sprockets.

Yet another object of the invention is to provide a conveyor for feeding tobacco to a cutter drum, whereby the spacing between the conveyor and the dead plate remains constant.

SUMMARY OF THE INVENTION

According to the invention there is provided a conveyor comprising:

a. a plurality of identical slats;
 b. means for connecting said slats together in an articulated manner so as to form an endless belt;
 c. a plurality of sprocket wheels supporting said endless belt, said sprocket wheels being formed with alternate sprocket teeth and pockets, each tooth having a substantially flat slat engaging face and
 d. a support plate positioned closely adjacent at least a portion of a straight run of said endless belt between said sprockets wherein
 e. each of said slats is formed with a plurality of extensions extending in the longitudinal direction of movement of the belt and a plurality of recesses formed between said extensions adapted to receive the extensions of the next adjacent slat,
 f. the sprocket engaging side of each slat being provided with a substantially flat portion for contacting said support plate,
 g. a sprocket tooth engaging surface on each slat whereby the slats are supported on said sprocket wheels without contact between said flat surface of each extension and said sprocket wheel.

The flat surface of each said slat extension preferably extends between inwardly and outwardly directed curved faces of different curvature. In a preferred embodiment, the radius of curvature of said pockets is greater than the radius of curvature of either of said inwardly and outwardly directed curved extension underside faces.

Each extension may have a transverse bore passing therethrough, and said retaining means comprises a pin passing through said bore and through corresponding bores in the extensions of the next adjacent slat.

Preferably, each recess has a bevelled edge and each slat has an upper surface which is provided with ridges.

BRIEF DESCRIPTION OF THE DRAWINGS

A constructional embodiment of the invention will now be described, purely by way of example, by reference to the accompanying drawings, in which.

DESCRIPTION OF THE PREFERRED EMBODIMENT

Figure 1:
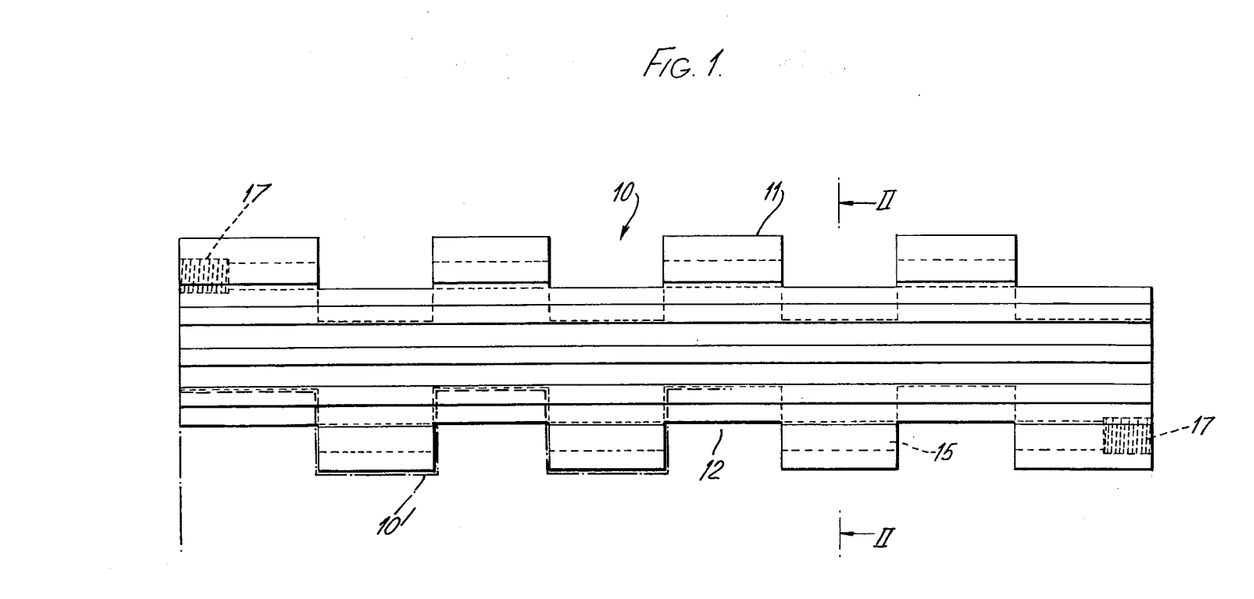
FIG. 1 shows a transverse slat of a conveyor band according to the invention.

A conveyor comprises a number of identical transverse slats, one of which is shown in FIG. 1. The transverse slat 10 has a number of extensions 11 extending in the longitudinal direction of the conveyor band with recesses 12 of the same transverse dimension therebetween. Only four extensions are shown, but in practice the slat may be provided with eight extensions on each side, although any number may be used. The dotted line 10' shows the position of the next adjacent slat in the conveyor.

Figures 2, 4:
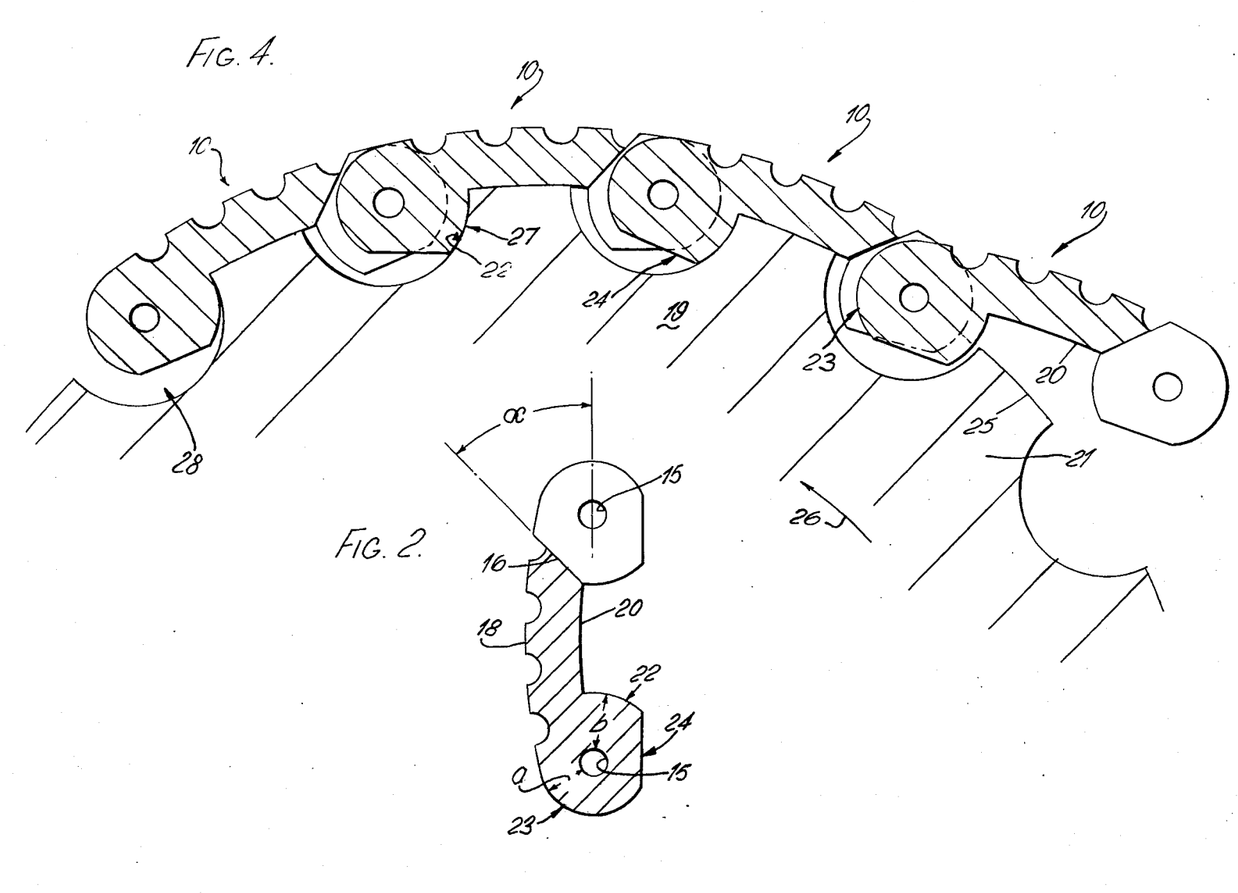
FIG. 2 is a section taken on the line II—II in FIG. 1.
FIG. 4 shows in section the conveyor band passing over a sprocket wheel.

FIG. 2 shows that each extension 11 is provided with a transverse hole 15 for receiving a pin for retaining the extension in a recess of the next adjacent slat. Each extension is provided with an inwardly directed curved face 22 having a radius of curvature $b$ greater than that $a$ of an outwardly directed curved face 23. A flat underside 24 is provided between the curved faces to support the conveyor on a support plate 29 in use (see FIGS. 5 and 8). Each recess is provided with a bevelled edge 16 where the angle $\alpha$ may be 45°. The upper face of the slat is provided with ridges 18 which, in use, serve to grip the tobacco while the under surface 20 of the slat is slightly concave.

Each end of the transverse slat is provided with a threaded hole 17 which serves to mount the slat on the conveyor.

Figure 3:
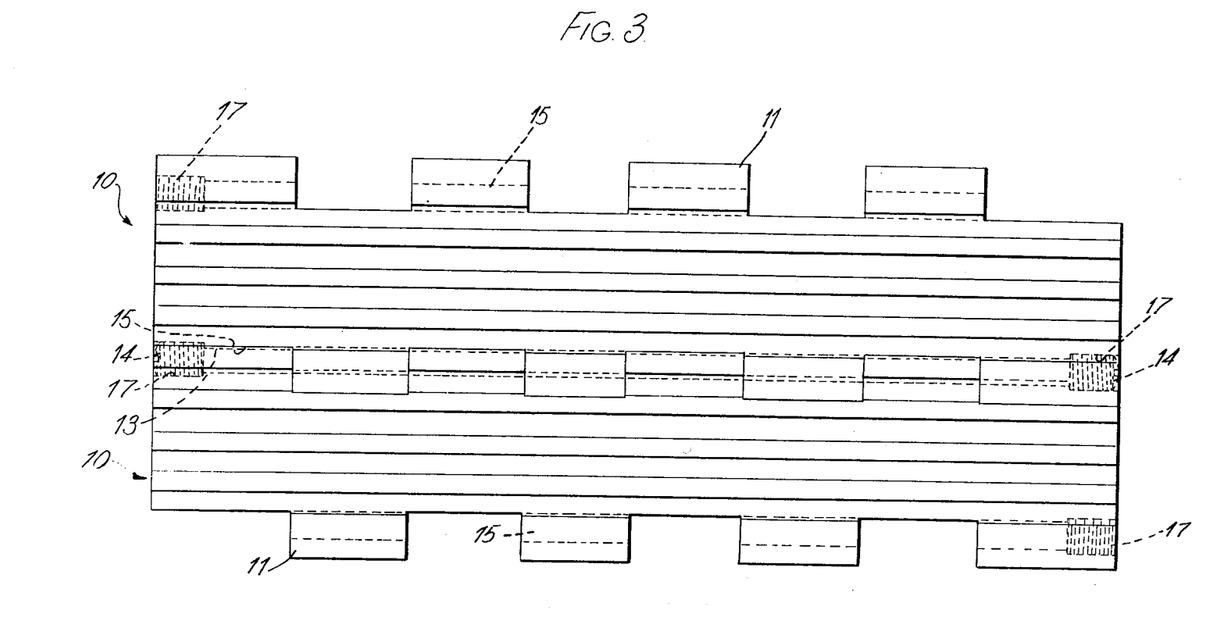
FIG. 3 shows a pair of slats as fixed together on the conveyor band.

As shown in FIG. 3 adjacent slats are held together by a common pin 13 which passes through the transverse hole 15 of each slat. The pin 13 is held in place by grub screws 14 screwed into the threaded hole 17 at each end of each slat.

FIG. 4 shows in section the conveyor made up of a number of slats 10 passing over a sprocket wheel 19. The sprocket wheel comprises a number of sprocket teeth 21 having lands or top surfaces 25 with a number of pockets 28 therebetween. It will be noticed that the under surface 20 of the band resets on the substantially flat tops 25 of the sprocket teeth 21 and that the flat underside or wear surface 24 of each slat extension is not contacted by the sprocket teeth thereby ensuring that despite wear of the wear surface 24 caused by friction between the wear surface 24 and the support plate 29, a constant pitch is maintained as the belt travels across the sprocket.

When the sprocket wheel is driven in the direction of the arrow 26, the leading face 27 of each sprocket tooth is engaged against the inwardly facing curved face 22 of a corresponding slat extension. It will be noted that since the radius of curvature of the pockets 28 between the sprocket teeth is greater than that of the extension of the slats, the outwardly facing surfaces 23 of the slat extensions are never in contact with the sprocket teeth, thus ensuring that the under surface 20 of the band always rests on the tops of the sprocket teeth. In FIG. 4, the dimensions are exaggerated for the sake of clarity.

The sprocket wheel is preferably of a type in which the lands 25 on the teeth are circumferentially long to reduce the tendancy for the link to rock about the tooth.

Figure 5:
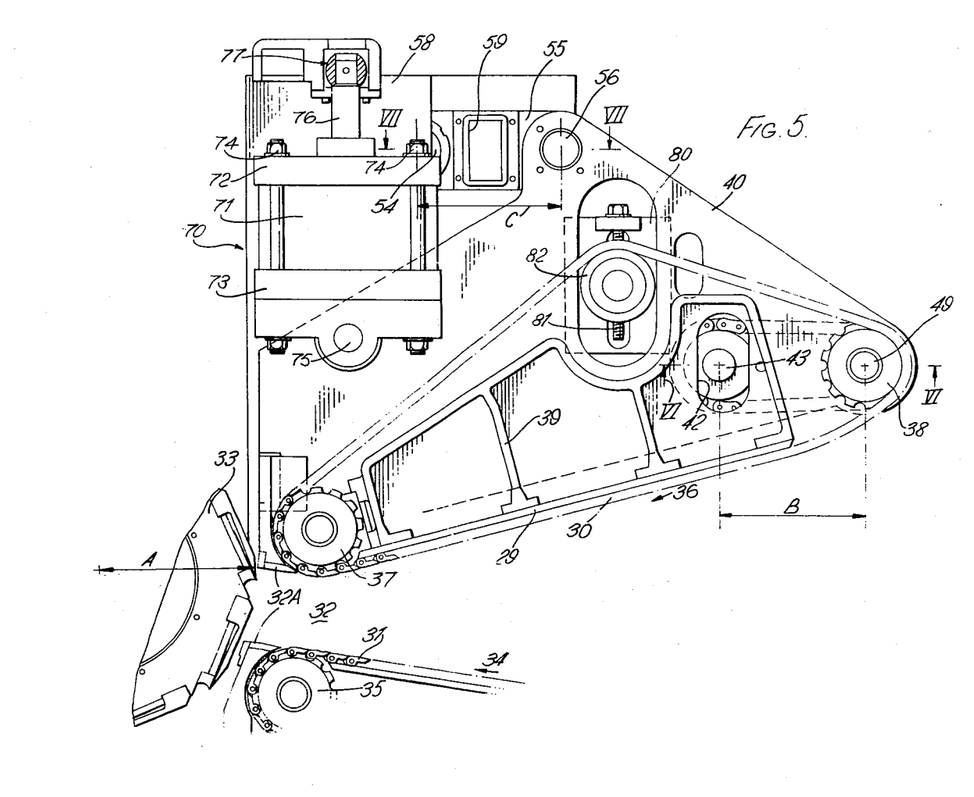
FIG. 5 is a side view of the top and bottom conveyor bands leading to the cutter drum.

The apparatus shown in FIG. 5 includes a top conveyor band 30 and a lower conveyor band 31 at an angle to each other so as to define a converging throat 32 for feeding tobacco to a cutter drum 33, not shown in detail. Each conveyor is constructed as described in connection with FIGS. 1 to 4. The lower conveyor belt band 31 moves in the direction 34 about the sprocket wheel 35, but is otherwise fixed in a position relative to the cutter drum by being mounted on the cutter machine casing.

The top conveyor band 30 moves in the direction 36 about sprocket wheels 37 and 38, but is also mounted in such a manner as to be adjusted relative to the lower conveyor band 31 so as to vary the size of the throat 32 and as a consequence thereof to vary the amount of tobacco being fed to the cutter drum 33. The conveyors are driven by means known per se to feed the tobacco through the throat. The tobacco is removed from the conveyor by dead plates 32A.

The use of a band conveyor according to the invention ensures that the spacing between the dead plate and the upper surface of the conveyor remains constant in use. In known devices, this gap increases as the belt wears causing tobacco to become blocked therein.

As can be clearly seen in FIG. 5, the upper dead plate 32A is mounted on a movable carriage as will be further described, and the lower dead plate 32A is fixedly mounted on the main frame. It should be understood that the dead plates 32A cannot be placed at the most constricted position of the throat 32. The tobacco is therefore allowed to expand slightly after reaching its maximum density, and by using a band conveyor according to the invention, this expansion ratio can be kept constant.

Forming the band from identical slats enables only one extrusion to be needed. This has the advantage that if desired the overall belt length can be shortened by as little as one pitch, which is not possible with the prior art devices.

The top conveyor band is supported on a carriage framework consisting of a pair of movable side plates 40 fixed to a central body 39 which also serves to carry the support plate 29. Only the nearest one of the side plates 40 can be seen in FIG. 5, the other side plate being positioned on the other side of the conveyor band, behind the side plate shown when viewed in FIG. 5. Referring to FIG. 6, which again only shows one of the side plates 40, an aperture 42 in each side plate 40 has a fixed input shaft 43 passing therethrough with a sprocket wheel 44 attached thereto. A chain 45 passes around the sprocket wheel 44 and drives a drive shaft 49 via a sprocket wheel 50. The conveyor band driving sprocket 38 is secured to the drive shaft 49 after the latter has passed through a bearing 51 in the side plate 40. The input shaft 43 passes through a bearing 52 in part 41 of the machine main frame 58 and is driven by a worm and worm wheel arrangement (not shown), known per se. Mounted for rotation on the input shaft 43 by way of a bearing 43A is one end of a link 53, the other end of which is rotatably mounted in a bearing 49A on the drive shaft 49.

Referring to FIG. 7, which again shows only one side of the apparatus, a stub shaft 54 is fixedly mounted on the machine main frame 58 and carries by way of a bearing 54A for rotation one end of a link 55. The arrangement is identical on the other side of the apparatus. The other end of each of the links 55 is rotatably connected by way of a bearing 56A to one end of a shaft 56 which is fixed to and passes through the side plates 40. To each of the links 55, a common link stretcher 59 is welded, which resists twisting.

Figure 6:
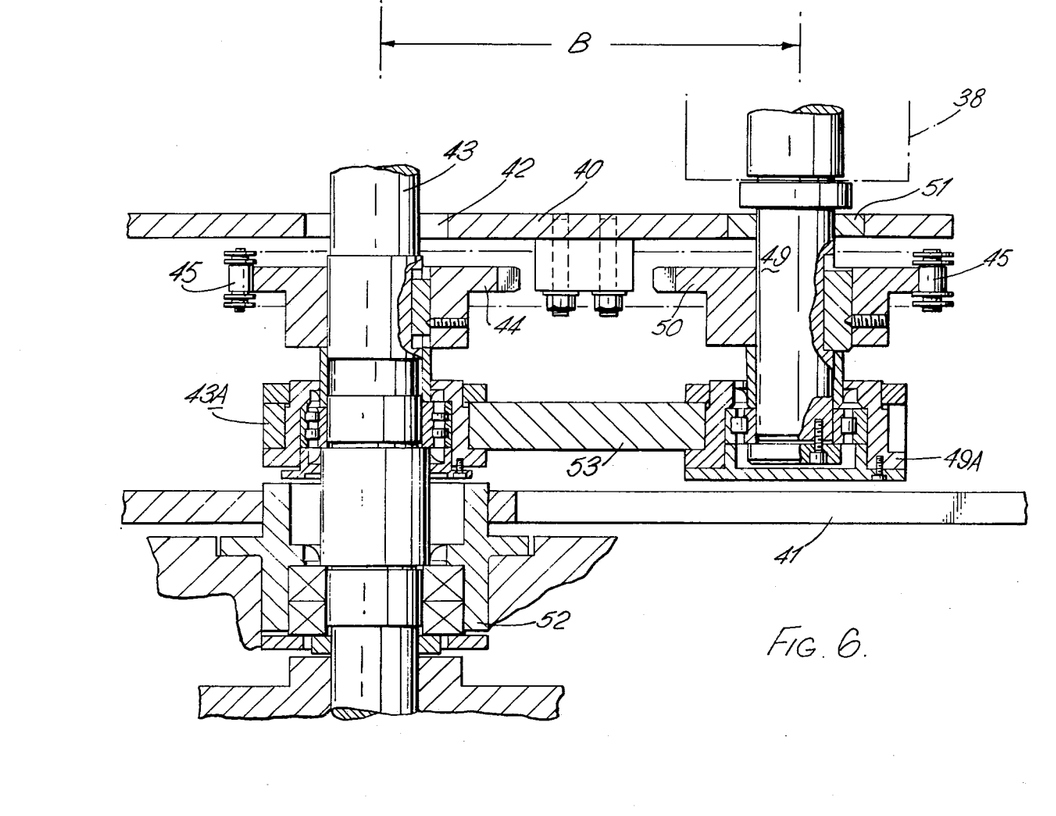
FIG. 6 is a partial view of a section on the line VI—VI of FIG. 5.
Figure 7:
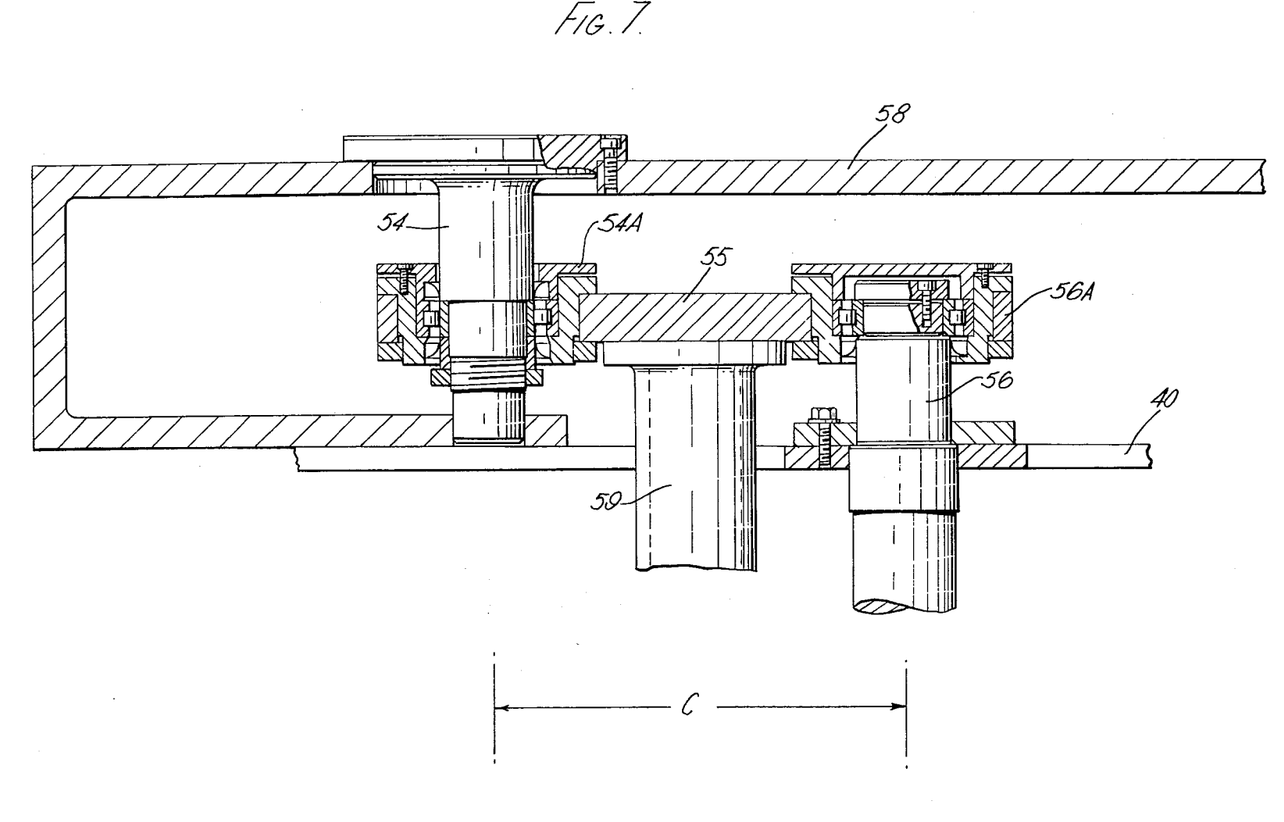
FIG. 7 is a partial view of a section on the line VII—VII of FIG. 5.

Referring to FIGS. 5, 6 and 7 it should be readily understood that links 53 and 55 provide a parallel linkage movably supporting the carriage on the main machine frame 58. As shown in FIG. 6, each link 53 (only one shown) is connected at one end to the carriage by shaft 49 and at its other end to the main machine frame 58. Similarly, as shown in FIG. 7, each link 55 (only one shown) is connected at one end to the carriage by the shaft 56 and at its other end to the main machine frame 58 by the shaft 54.

In order to reduce the number of critical dimensions relating to the parallel linkage (links 53 and 55) support of the carriage and thus eliminate the possiblity of the drive centre distance varying due to manufacturing inaccuracies, the radius A of the cutter drums 33 is equal to the distance B between the input shaft 43 and the drive shaft 49 and the distance C between the stub shaft 54 and the shaft 56. In this manner, the carriage is able to be swung on links 53 and 55 so that any point on the carriage moving a path around a radius equal to the radius of the cutter drum 33. Therefore as the carriage moves the upper conveyor band 30 toward and away from the lower conveyor band 31, the upper dead plate will simultaneously move toward and away from the lower dead plate along a path concentric with the cutter drum 33.

Figure 8:
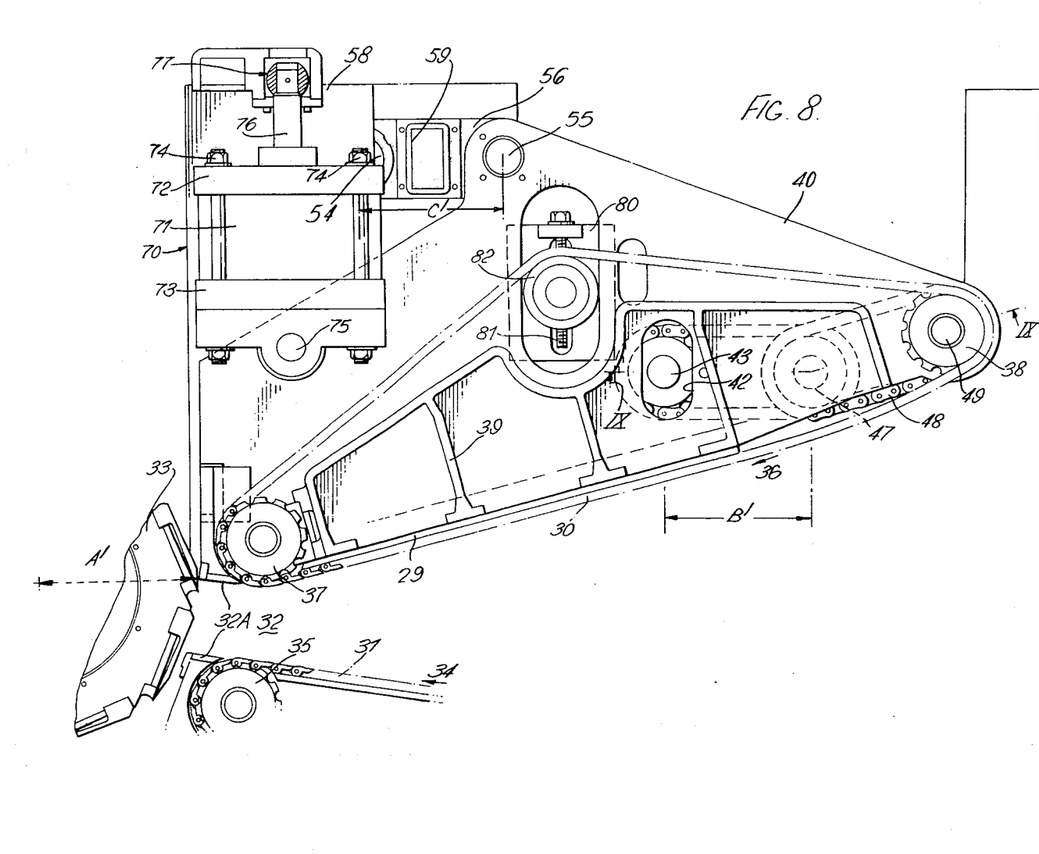
FIG. 8 is a side view of the top and bottom conveyor bands leading to the cutter drum of an alternative embodiment.
Figure 9:
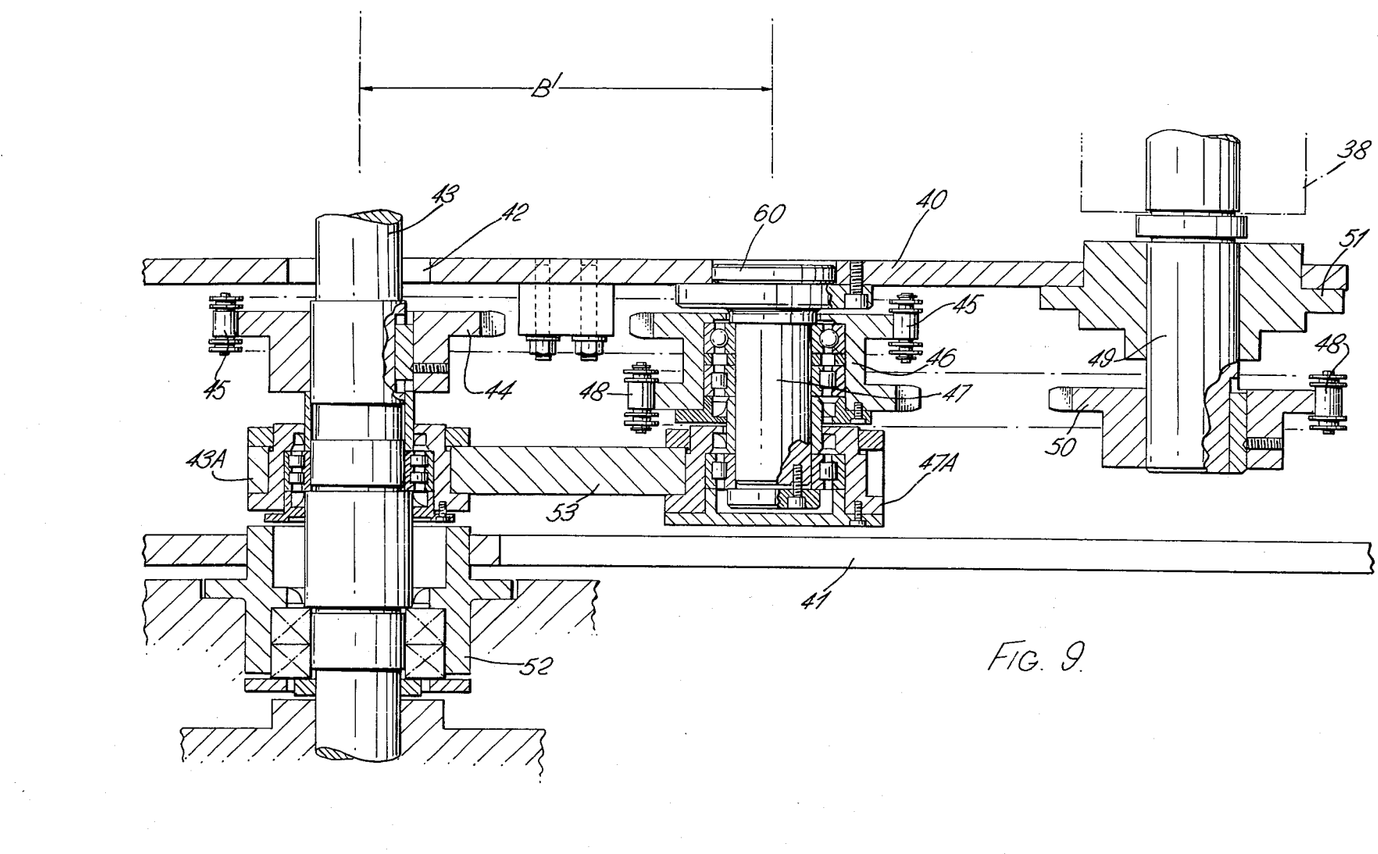
FIG. 9 is a partial view of a section taken on the line IX—IX of FIG. 8.

In the alternative embodiment shown in FIGS. 8 and 9 (in which features in common with the embodiment shown in FIGS. 4 to 6 are given like reference numbers) the chain 45 passes around the sprocket wheel 44 and also around one sprocket of a double sprocket wheel 46 rotatably mounted on a transfer shaft 47 fixed to the side plate 40 by means of a mounting 60. Passing around the other sprocket of the double sprocket wheel 46 is a second chain 48 which drives the drive shaft 49 via the sprocket wheel 50. In this embodiment the other end of the link 53 is rotatably mounted on the transfer shaft 47 and, by way of a bearing 47A the radius $A^1$ of the cutter drum is equal to the distance $B^1$ between the input shaft 43 and the transfer shaft 47 and the distance $C^1$ between the stub shaft 54 and the shaft 56.

As shown in both FIGS. 5 and 8, means 70 are provided whereby the carriage may be moved on links 53 and 55, as previously described, relative to the lower conveyor. Means 70 comprises a pneumatic loading cylinder 71 which is bolted between end plates 72, 73 by means of bolts 74. The lower end plate 73 is trunion mounted to the carriage 40 at 75. Extending from the upper end of the cylinder 71 is a piston rod 76 which via a ball mounting 77 is fixed in position relative to the side plates of the machine. The cylinder 71 is supplied with compressed air by means not shown, whereby the position of the carriage 40 can be adjusted.

The carriage 40 carries plates 80 which via screw members 81 support a tensioning roller 82 by means of which the tension of the conveyor 30 may be adjusted.

I claim:

1. A conveyor comprising a plurality of identical slats, means for connecting said slats together in an articulated manner so as to form an endless belt, a plurality of sprocket wheels supporting said endless belt, said sprocket wheels being formed with alternate sprocket teeth and pockets each tooth having a substantially flat slat engaging face, a support plate positioned closely adjacent at least a portion of a straight run of said endless belt between said sprockets, each of said slats being formed with a plurality of extensions extending in the longitudinal direction of movement of the belt and a plurality of recesses formed between said extensions adapted to receive the extensions of the next adjacent slat, said extensions each being provided with a substantially flat portion on the sprocket engaging side of each slat, a sprocket tooth engaging surface on each slat whereby the slats are supported on said sprocket wheels said flat surface of each extension held out of contact with said sprocket wheel, and said flat portions contacting said support plate and holding said sprocket tooth engaging surface on each slat out of contact with said support plate; a further conveyor arranged in converging relationship to the first conveyor for feeding tobacco to the cutter drum of a tobacco cutting machine, a cutting machine casing supporting said further conveyor, drive means for said first conveyor and including a input drive shaft positioned in fixed relationship relative to the cutting machine casing, a carriage supporting said first conveyor, a first link pivoted at a first pivot point on said cutting machine casing and pivoted at a second pivot point on said carriage and a second link pivoted at a first piovt point on said input drive shaft and pivoted at a second pivot point on said carriage, said first and second links being parallel and the distance between said first and second pivot points of said first link being equal to the distance between said first and second pivot points of said second link to form a parallelogram linkage and means for moving said carriage relative to said other conveyor to vary the converging relationship between said conveyors; and a further shaft connected to one of said belt supporting sprocket wheels so as to rotate therewith, an intermediate shaft carried by said carriage, said second link being pivoted on said intermediate shaft, a first further sprocket wheel fixed to said further shaft, a double sprocket wheel mounted on said intermediate shaft and adapted to rotate freely, a second further sprocket wheel fixed to said input drive shaft and chain drives between said first further sprocket wheel and said double sprocket wheel and between said second further sprocket wheel and said double sprocket wheel, thereby to transfer drive from said input drive shaft to said first conveyor.

* * * * *